(12) United States Patent
Duprat et al.

(10) Patent No.: US 10,857,890 B2
(45) Date of Patent: Dec. 8, 2020

(54) CURRENT COLLECTOR SHOE WITH RAPID RETRACTION

(71) Applicant: ALSTOM Transport Technologies, Saint-Ouen (FR)

(72) Inventors: Patrick Duprat, Le Raincy (FR); Leonardo Formenti, Barzano (IT)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 272 days.

(21) Appl. No.: 15/962,034

(22) Filed: Apr. 25, 2018

(65) Prior Publication Data

US 2019/0001823 A1    Jan. 3, 2019

(30) Foreign Application Priority Data

Apr. 25, 2017    (FR) ...................... 17 53588

(51) Int. Cl.
| | | |
|---|---|---|
| *B60L 5/38* | (2006.01) | |
| *B60L 5/30* | (2006.01) | |
| *B60L 50/53* | (2019.01) | |
| *B60L 5/08* | (2006.01) | |

(52) U.S. Cl.
CPC  *B60L 5/38* (2013.01); *B60L 5/08* (2013.01); *B60L 5/30* (2013.01); *B60L 50/53* (2019.02); *B60L 2200/26* (2013.01)

(58) Field of Classification Search
CPC ...... B60L 5/00; B60L 5/04; B60L 5/08; B60L 5/18; B60L 5/19; B60L 5/20; B60L 5/22; B60L 5/28; B60L 5/30

See application file for complete search history.

(56) References Cited

U.S. PATENT DOCUMENTS

| | | | |
|---|---|---|---|
| 9,931,941 B2 | 4/2018 | Pachler | |
| 2016/0185227 A1* | 6/2016 | Pachler | .................. B60L 53/14 |
| | | | 320/107 |
| 2017/0136897 A1* | 5/2017 | Ricci | ...................... B60L 5/005 |

FOREIGN PATENT DOCUMENTS

CN          205220396          5/2016

OTHER PUBLICATIONS

Preliminary Search Report for FR 17 53588, dated Dec. 15, 2017.

* cited by examiner

*Primary Examiner* — Robert J McCarry, Jr.
(74) *Attorney, Agent, or Firm* — B. Aaron Schulman, Esq.; Stites & Harbison, PLLC

(57) ABSTRACT

The invention relates to a shoe (10) on an electrical power supply track for an electric railway vehicle, the shoe (10) comprising:
- a power supply flange (12) movable between a retracted position and a deployed position;
- an actuator (11) able to move the flange between the retracted and deployed positions; and
- a mechanical system (13) connecting the flange to the actuator;

characterized in that the actuator (11):
- has a movement speed such that it is able to move the flange (12) between its retracted and deployed positions in a time period shorter than or equal to 1 second, and preferably shorter than or equal to 0.5 seconds; and
- has a number of operating cycles before failure greater than or equal to 2,500,000.

9 Claims, 1 Drawing Sheet

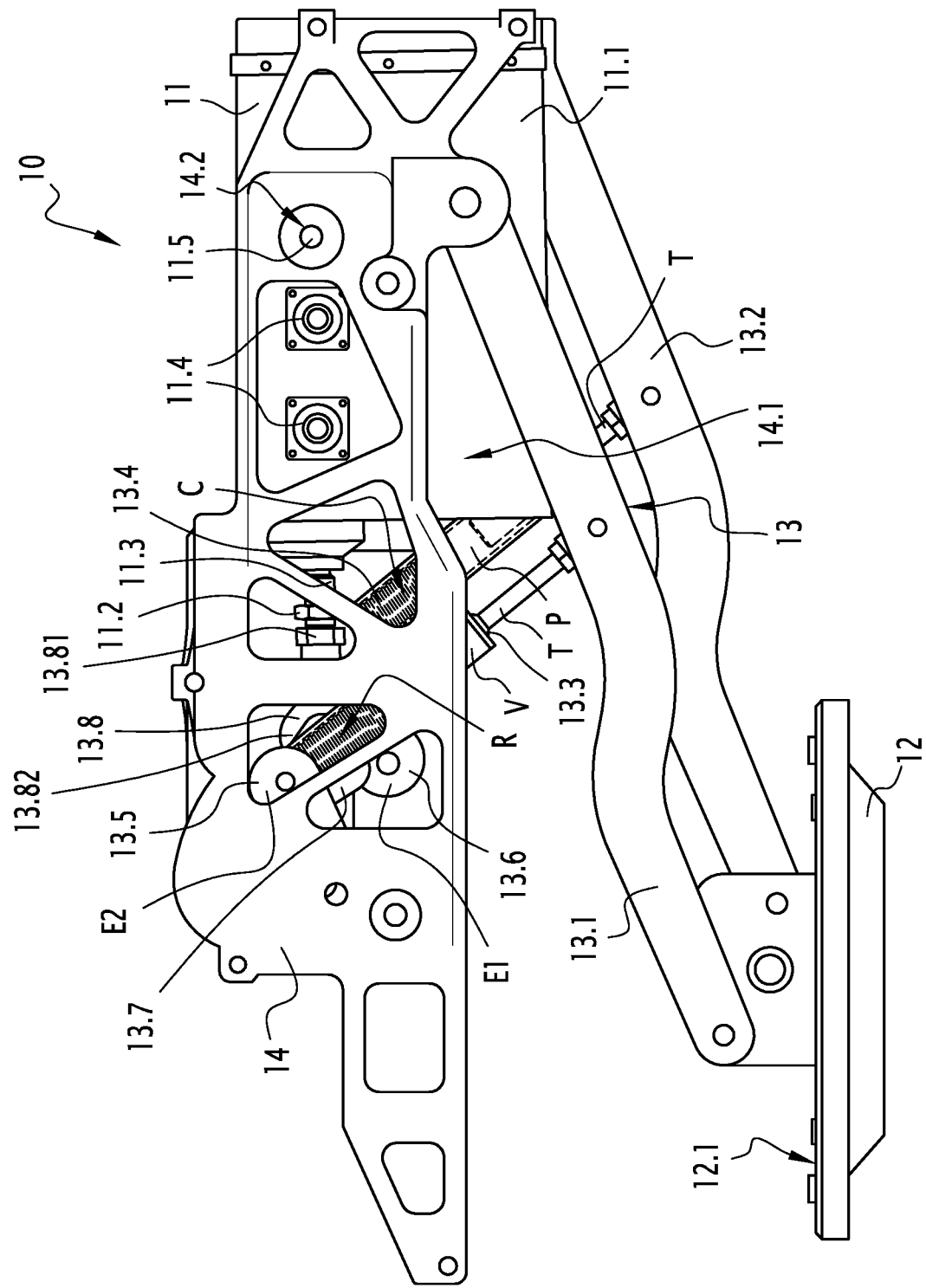

CURRENT COLLECTOR SHOE WITH RAPID RETRACTION

The present invention relates to a current collector shoe on an electrical power supply track for an electric railway vehicle, comprising a flange able to be placed in sliding contact with said power supply track, this flange being movable between a retracted position and a deployed position, an actuator able to move the flange between the retracted and deployed positions and a mechanical system connecting the flange to the actuator in order to convert a movement of the actuator into a movement of the flange.

Such a shoe is known and integrated into the Citadis trams by the applicant traveling in the city of Bordeaux. It includes a flange. The flange can be retracted and deployed using an electric jack. To that end, the electric jack acts on a mechanical system made up of arms forming a parallelogram.

This shoe is designed for a railway network having a primarily aerial electrical power supply by catenary interrupted by several ground power supply segments. During the operation of the tram, a deployment or retraction of the shoe gear only occurs periodically when the tram is stopped at a station and goes from a segment of the aerial power supply grid to a ground-level power supply segment or vice versa.

Such a shoe gear is not suitable for a railway vehicle such as a tram that travels on a network where the tram must constantly alternate between a ground-level power supply and another power supply, such as an autonomous power supply by onboard batteries.

One aim of the invention is therefore to produce a shoe for a railway vehicle with an electrical power source alternating frequently, in particular during travel, between a ground-level power supply and another power supply, in particular autonomous.

According to the invention, this aim is achieved with the shoe as defined above, in which the actuator has a movement speed such that it is able to move the flange between its retracted and deployed positions in a time period shorter than or equal to 1 second, preferably shorter than or equal to 0.5 seconds, and has a number of operating cycles before failure greater than or equal to 2,500,000.

By replacing the old electric jack with an actuator performing at a high movement speed, the flange of the shoe moves very quickly between its two positions. Thus, a change in the electoral power supply mode is possible dynamically. The flange can be deployed or retracted even when the railway vehicle moves at its maximum speed.

According to the invention, the actuator of the shoe has a high number of operating cycles before failure. Consequently, the shoe supports a large number of retractions and deployments of the flange during the travel of the railway vehicle.

According to preferred embodiments, the shoe according to the invention comprises one, several or all of the following, according to all technically possible combinations:

The actuator comprises an electric motor, preferably brushless;
The shoe comprises an antenna for radio reception of a movement order of the flange;
The antenna is arranged in the flange;
The mechanical system comprises a set of elements for converting a horizontal movement of an actuating member of the actuator into a vertical movement of the flange;
The set of conversion elements comprises at least one piston cylinder; and
Each piston cylinder includes a spring stressing the flange toward its deployed position.

The invention further relates to a railway vehicle, in particular a tram, comprising at least one shoe having a movement speed such that it is able to move the flange between its retracted and deployed positions in a time period shorter than or equal to 1 second, preferably shorter than or equal to 0.5 seconds, and having a number of operating cycles before failure greater than or equal to 2,500,000.

The invention also relates to a railway vehicle, in particular a tram, comprising at least one shoe as defined above.

BRIEF DESCRIPTION OF THE DRAWING FIGURE

FIG. 1 is a side view of the current collector shoe of the claimed invention.

The current collector shoe 10 is shown in the deployed state. It comprises an actuator 11, a current collector flange 12, a mechanical system 13 kinematically connecting the actuator 11 to the flange 12, and a frame 14 bearing the actuator 11, the flange 12 and the mechanical system 13.

The mechanical system 13 comprises first and second deployment levers 13.1 and 13.2, first and second piston cylinders 13.3 and 13.4, first and second supports 13.5 and 13.6 for the cylinders 13.3 and 13.4, a transmission fork 13.7, and a driving pin 13.8. In one embodiment, the mechanical system 13 is made up of these elements. This involves a set of elements for converting a horizontal movement of an actuating member 11.2 of the actuator 11 into a vertical movement of the flange 12.

The actuator 11 comprises a case 11.1. An actuating rod (or member) 11.2 is mounted sliding in an opening 11.3 of the actuator 11. The actuator 11 also has several inlets 11.4 used for the electrical supply and control. The actuator 11 is able to move the flange 12 between a retracted position and a deployed position shown in the FIGURE.

The actuator 11 has a movement speed such that it is able to move the flange 12 between its retracted and deployed positions in a time period shorter than or equal to 1 second, and preferably shorter than or equal to 0.5 seconds. Movement speed of the actuator 11 refers to the speed at which the actuating rod 11.2 moves between its extended and withdrawn positions.

Furthermore, the actuator 11 has a number of operating cycles before failure greater than or equal to 2,500,000. An operating cycle refers to a raising and lowering of the flange 12.

To that end, the actuator 11 preferably comprises an electric motor, in particular brushless. Brushless electric motors have a short reaction time, are reliable and can be controlled by a control unit.

A mechanism inside the case 11.1 converts a rotational movement of the electric motor into a translational movement of the actuating rod 11.2.

The actuator 11 is arranged within an inner space 14.1 of the frame 14. More specifically, the actuator 11 has two pivot pins 11.5 placed in bearings 14.2 of the frame 14.

The actuating rod 11.2 is connected to a first end 13.81 of the driving pin 13.8. The other end 13.82 of the driving pin 13.8 is mounted pivoting between two ends of the transmission fork 13.7. The transmission fork 13.7 is located between the two cylinder supports 13.5 and 13.6. It is connected to the latter in order to pivot them relative to the frame 14 between a low position (flange 12 deployed) and a high position (flange 12 retracted). The low position is illustrated in the FIGURE.

One of the ends E1 of the cylinder supports 13.5 and 13.6 is mounted pivoting on the frame 14. The other end E2 pivotably accommodates the heads of the cylinders 13.3 and 13.4.

Each piston cylinder 13.3 and 13.4 has a cylindrical chamber C formed by an enclosure V and accommodating a compression spring R. Each spring R acts between a cylinder head and the piston P of a piston cylinder 13.3, 13.4. The rods T of the pistons P are pivotably connected to the deployment levers 13.1 and 13.2.

One end of the deployment levers 13.1 and 13.2 is pivotably secured to the frame 14. The other end is pivotably attached to the flange 12.

Preferably, the flange 12 accommodates an antenna 12.1 for radio reception of a movement order of the flange.

The deployment and retraction of the flange 12 are done as follows.

In order to retract the flange 12 in the nonactive position, starting from the deployed position shown in the FIGURE, the actuator 11 is started. This causes the actuating rod 11.2 to slide outward outside the case 11.1. This movement is relayed to the transmission fork 13.7 via the driving pin 13.8. The transmission fork 13.7 causes the cylinder supports 13.5 and 13.6 to pivot toward the rear and upward in the FIGURE. Consequently, the levers 13.1 and 13.2 are pulled upward by the rods T of the piston cylinders 13.3 and 13.4. In this way, the flange 12 is retracted.

In order to deploy the flange 12 in the current intake position, the actuator 11 is activated again. This time, the actuating rod 11.2 withdraws toward the inside of the case 11.1. The components of the mechanical system 13 then perform the reverse movements, thereby deploying the flange 12. It will be noted that, when the flange 12 abuts on a power supply track during its deployment, the withdrawal of the actuating rod 11.2 continues. In this way, the pistons P rise inside enclosures V and compress the springs R. The compressed springs R then stress the flange 12 toward its deployed position and therefore toward the current supply track. This stress causes a loss of contact between the flange 12 and the power supply track.

It is possible to provide a control unit making it possible to control the behavior of the actuator 11, and in particular its movement speed.

The invention claimed is:

1. A current collector shoe on an electrical power supply track for an electric railway vehicle, the shoe comprising:
a flange able to be placed in sliding contact with said power supply track, said flange being movable between a retracted position and a deployed position;
an actuator able to move the flange between the retracted and deployed positions; and
a mechanical system connecting the flange to the actuator in order to convert a movement of the actuator into a movement of the flange;
wherein the actuator:
has a movement speed that is able to move the flange between its retracted and deployed positions in a time period shorter than or equal to 1 second;
has a number of operating cycles before failure greater than or equal to 2,500,000; and
comprises an electric brushless motor.

2. The shoe according to claim 1, further comprising an antenna for radio reception of a movement order of the flange.

3. The shoe according to claim 2, wherein the antenna is arranged in the flange.

4. The shoe according to claim 1, wherein the mechanical system comprises a set of elements for converting a horizontal movement of an actuating member of the actuator into a vertical movement of the flange.

5. The shoe according to claim 4, wherein said assembly comprises at least one piston cylinder.

6. The shoe according to claim 5, wherein each piston cylinder includes a spring stressing the flange toward its deployed position.

7. A railway vehicle comprising at least one shoe according to claim 1.

8. The vehicle according to claim 7, wherein the vehicle is a train.

9. The shoe according to claim 1, wherein the actuator has a movement speed that is able to move the flange between its retracted and deployed positions in a time period that is shorter than or equal to 0.5 seconds.

* * * * *